(12) United States Patent
Goetz

(10) Patent No.: US 6,675,692 B1
(45) Date of Patent: Jan. 13, 2004

(54) PYROTECHNIC ACTUATOR

(76) Inventor: Coenen Goetz, Bosinghofener Strasse 46, Meerbusch (DE), D-40668

( * ) Notice: Subject to any disclaimer, the term of this patent is extended or adjusted under 35 U.S.C. 154(b) by 0 days.

(21) Appl. No.: 09/979,764

(22) PCT Filed: Feb. 17, 2000

(86) PCT No.: PCT/EP00/01281
§ 371 (c)(1),
(2), (4) Date: Mar. 11, 2002

(87) PCT Pub. No.: WO00/70231
PCT Pub. Date: Nov. 23, 2000

(30) Foreign Application Priority Data

May 18, 1999 (DE) .......................... 199 22 674

(51) Int. Cl.$^7$ .............................................. F42C 15/00
(52) U.S. Cl. ...................................... 89/1.14; 102/202.1
(58) Field of Search ............................ 89/1.14, 1.812, 89/28.05, 28.1; 60/508, 635, 636, 632; 102/202.1, 202.3

(56) References Cited

U.S. PATENT DOCUMENTS

| | | | |
|---|---|---|---|
| 3,234,727 A | * | 2/1966 | Filer ........................... 60/632 |
| 3,893,298 A | * | 7/1975 | Williams ..................... 60/635 |
| 4,091,621 A | * | 5/1978 | Patrichi ....................... 60/635 |
| 4,121,854 A | * | 10/1978 | Cornu .......................... 280/612 |
| 4,860,698 A | * | 8/1989 | Patrichi et al. ............. 123/24 R |
| 4,978,089 A | * | 12/1990 | Alquier et al. ............. 244/129.5 |
| 5,110,185 A | * | 5/1992 | Schmutz et al. ............. 297/410 |
| 5,655,791 A | | 8/1997 | Nowack et al. ............. 280/756 |
| 5,660,414 A | * | 8/1997 | Karlow et al. ............. 280/749 |
| 6,168,193 B1 | * | 1/2001 | Shirk et al. ............... 280/730.2 |
| 6,352,285 B1 | * | 3/2002 | Schulte et al. ............. 280/756 |
| 6,474,681 B2 | * | 11/2002 | Peer et al. ................. 280/730.2 |

FOREIGN PATENT DOCUMENTS

| | | | |
|---|---|---|---|
| EP | 0 734 910 | 6/2000 | |
| GB | 2238672 A | * 6/1991 | ............ F42B/3/10 |

* cited by examiner

Primary Examiner—Michael J. Carone
Assistant Examiner—Gabriel Sukman
(74) Attorney, Agent, or Firm—Factor & Partners

(57) ABSTRACT

The invention relates to a pyrotechnic actuator that comprises a housing (1) with a cavity (5) in which a piston (2) is displaceably received. Said piston (2) can be adjusted from an initial position to a terminal position by means of a gas quantity that is produced when an explosive is ignited. Said piston (2) triggers a mechanical action on its path towards the terminal position or once it reaches the terminal position while at least one snap-in element and/or one spring-elastic retaining element (2z, 8) retains the piston in the initial position.

33 Claims, 4 Drawing Sheets

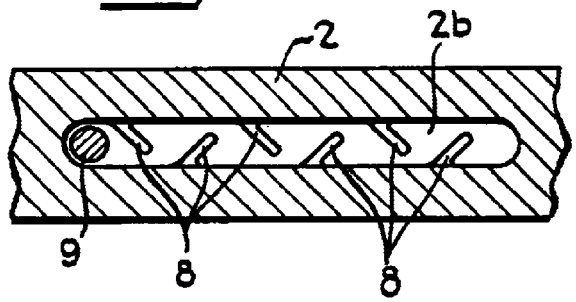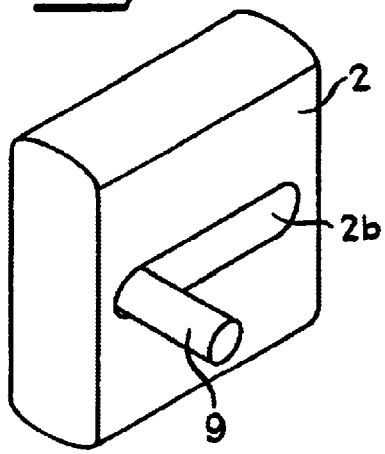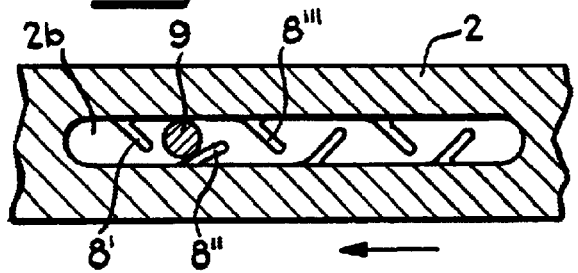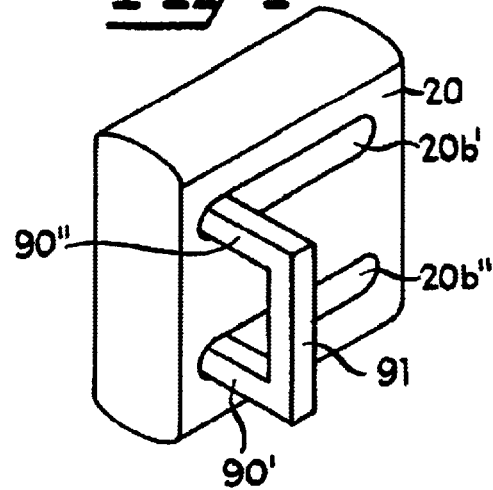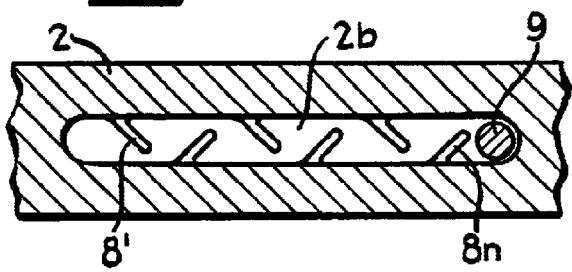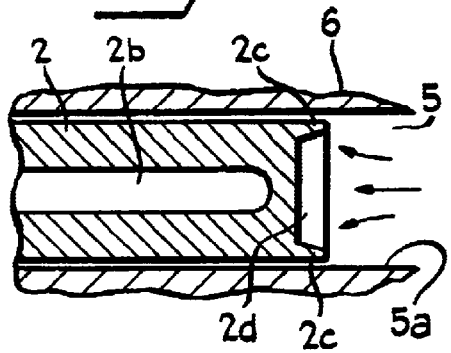

Figure 1:
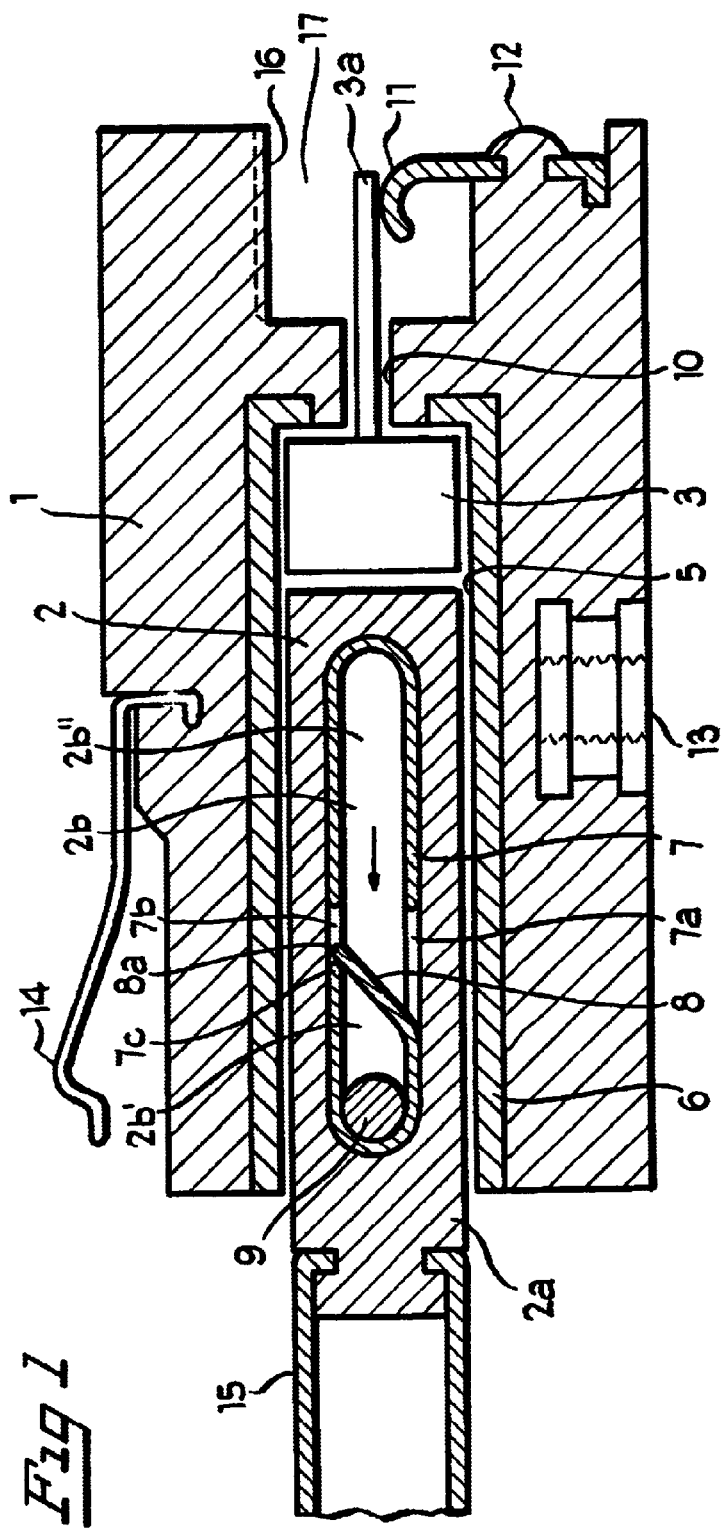

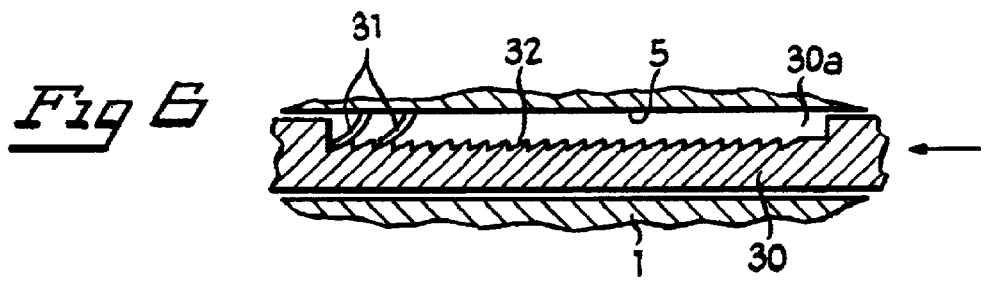
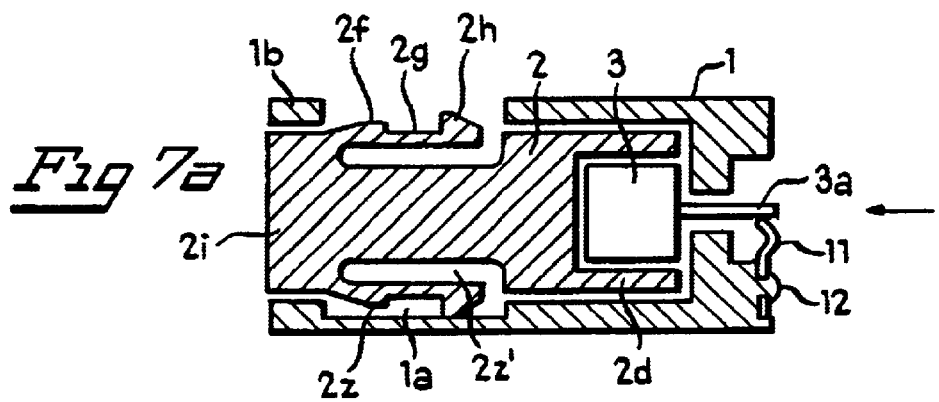
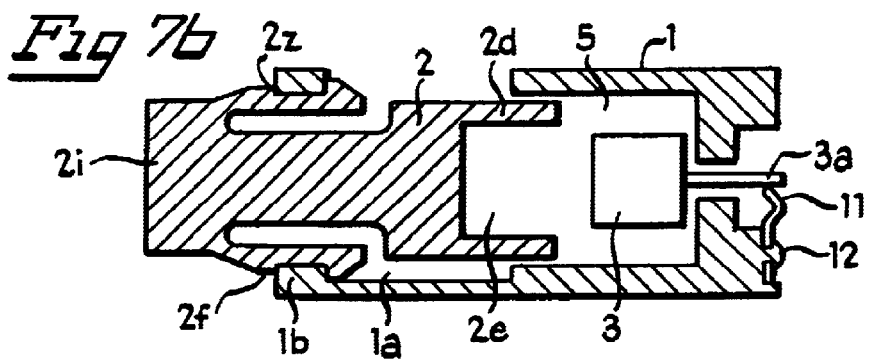
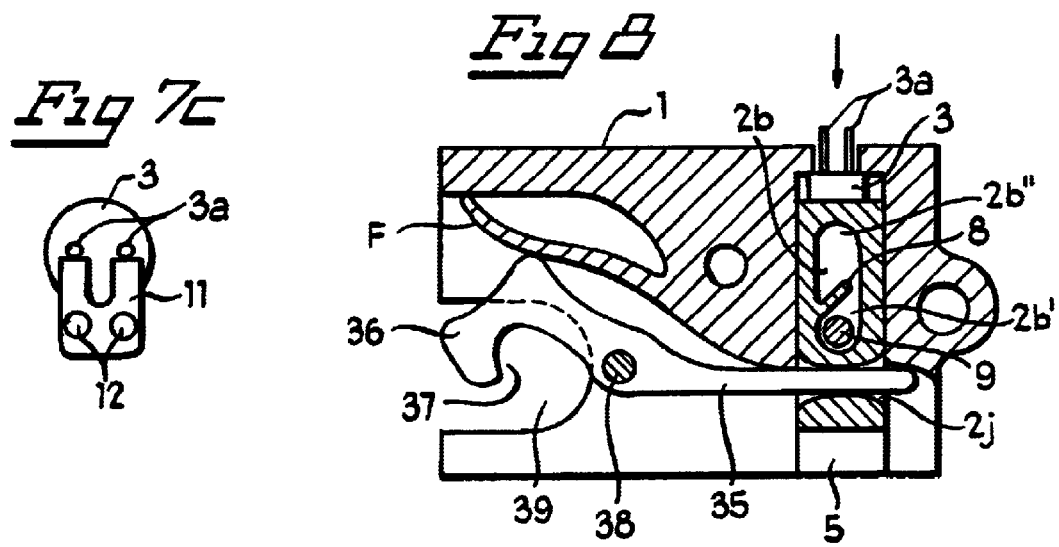

PYROTECHNIC ACTUATOR

The present invention relates to a pyrotechnic actuator according to the preamble of claim 1.

A generic actuator is known from U.S. Pat. No. 4,091,621. The U.S. Pat. No. 4,091,621 shows a pyrotechnic actuator, in the case of which an explosive is electrically ignitable, whereby the gas arising moves a piston. A lock prevents the piston returning from its terminal position to its initial position. In this case the locking action is provided by a c-shaped clamp ring held in a circumferential groove of the piston, which in the compressed, that is to say spring-loaded condition lies in the cylinder with the piston. As soon as the piston is moved out of the cylinder by the developing gas, the tensioned, c-shaped ring can de-tension, as a result of which its radius becomes greater than the inner radius of the cylinder. Also in the de-tensioned condition the c-shaped ring remains in the groove of the piston. If the piston tries to move back again to its initial position, the c-shaped ring strikes the head of the cylinder and prevents the piston from entering the cylinder.

A disadvantage with this embodiment according to U.S. Pat. No. 4,091,621 is that the piston is only retained in its position by friction. This friction stops when the c-shaped ring has left the cylinder. Secure anchoring of the piston in its initial position is however not assured by friction. If it is further considered that such systems must be ready to operate but are not used over a long period, the locking requirement cannot be met by means of friction. This is especially therefore the case, since there is no guarantee that the tension in the c-shaped ring is maintained for several years by the metal. If for example the pyrotechnic actuator is used in a vehicle, this must still be completely functional after 10 or 20 years. This is only guaranteed if the piston always remains in its initial position.

The aim of the present invention is therefore to provide a pyrotechnic actuator, in which the piston is securely retained in its initial position. This aim is achieved according to the invention by a pyrotechnic actuator with the features of claim 1. Further advantageous embodiments of the object of the invention are clear from the features of the sub-claims.

Through the use of a snap-in element and/or a sprung retaining element the piston is advantageously retained in the initial position. Corresponding elements can for example be sprung contact studs or snap connections. The action of the elements guarantees in this case that simply by applying minimum force to the piston it can be moved from its initial position to the terminal position. Through the use of corresponding ratchet- or retaining elements the necessary minimum force can be pre-determined precisely. This is an important advantage compared to the known friction, which is affected by several factors and which can only be inadequately calculated. In addition the necessary minimum force for moving the piston from the initial to the terminal position does not change over time, since for example a sprung contact stud as an initial position retaining element is not stressed by force, but force is only applied on it when the piston is moved. As a result metal fatigue is prevented advantageously.

The ratchet- or retaining elements used advantageously at the same time to serve as retaining elements, which retain the piston in the terminal position after this has been reached. This means that advantageously no extra parts are required and therefore the retaining function in the initial as well as in the terminal position can be realised with few parts.

Advantageously several ratchet- or retaining elements can be provided so that the piston is prevented from going back to the initial position, not just after reaching the terminal position, but also on the way from the initial position to the terminal position it is prevented by the several ratchet or retaining elements, after passing one of the elements, from going back from this position to the initial position.

Advantageously both the ratchet as well as the retaining elements can together ensure the piston is locked. In this case all locking mechanisms, which in particular are the embodiments illustrated in the figures, can be used in combination with one another.

Advantageously the ratchet- and/or retaining elements are moulded or secured on the piston or the cylinder itself. In this case for example as snap-in or retaining elements a contact stud or bow-spring can be used, which for example interacts with a saw-tooth shaped surface structure or engages in appropriately functional cavities, so that the piston can move in relation to the cylinder each time in only one direction after overcoming a minimum force.

An especially preferred embodiment of a pyrotechnic actuator is the case if the piston has a cavity extending in the lengthwise direction of the piston, into which a stud on the housing engages as the gripping mechanism, whereby the ratchet or securing elements work together with the pin or stud fixed rigidly on the housing. The pin or stud together with the longitudinal cavity or oblong window-type aperture acts as a bearing and guide for the stud. In this case the ratchet or retaining elements are arranged on the piston itself.

If the piston is an injection moulded part, the ratchet- or retaining elements can be formed by means of a plate inserted in the piston, whereby for example the plate advantageously forms the wall of the oblong cavity or window-type aperture, so that the stud can securely slide in the oblong cavity or window-type aperture. Through the use of a suitably curved and stamped metal plate to form the inner wall as well as the ratchet or securing elements, the piston can also be reinforced, as a result of which greater forces can be applied by the piston itself to trigger a particular operation.

Through the advantageous use of an oblong cavity or window-type aperture for the interplay with a locking pin or stud, the ratchet or securing elements can be designed so that the pin or stud pivots or moves the ratchet or securing elements to the side when the piston moves from the initial position to the terminal position, whereby after passing the ratchet or securing elements these are moved back to their initial position either by an external spring or bending force stored in the element itself. The ratchet or securing element with positive locking then prevents the locking stud from moving against the movement direction from the initial position to the terminal position in the piston past the ratchet- or securing element to its initial position.

Positive locking is achieved particularly advantageously if the ratchet- or securing element is a contact stud, which fully passes through the window-type aperture, so that if the stud is moved with its free end in relation to the piston against the movement direction from the initial to terminal position, it is pressed by the stud against a stop. Only by destroying the ratchet or locking element can the piston now be moved back to its initial position. Through corresponding design of the ratchet or locking element however the force necessary for destruction can be calculated in such a way that destruction by forces acting on the piston from outside is not possible.

Advantageously the electrical detonator together with any necessary explosive is arranged directly in the cavity of the housing and therefore in the cylinder of the pneumatically operated cylinder. The electrical detonator has electrical ignition contacts, which are fed out from the cavity through at least one aperture, so that they can be connected to an ignition circuit. The housing of the pyrotechnic actuator is designed to advantage in such a way that in the unassembled condition of the pyrotechnic actuator the electrical connections of the detonator are short-circuited by means of a short-circuit element. This short-circuit element can be secured on the housing by means of a snap-connection; it is however also conceivable that the short-circuit element is injection moulded directly during manufacture of the housing especially made from plastic. If the housing is a metallic material, stud-shaped elements can be moulded in such a way that these short-circuit the electrical contacts when the detonator is inserted into the cavity. Irrespective of whether the short-circuit elements have been moulded or added afterwards, they are moved away, on connection to an electrical plug, which is designed to connect the detonator with the ignition electronics, from the electrical connections of the detonator, so that the short-circuit is broken.

An equally preferred embodiment is the case if in addition to the piston a part which can pivot and/or is displaceably held is arranged on or in the housing, is in communication with the piston and is swung or displaced when the piston moves from its initial to its terminal position. Through integration of such a pivotable part, which is especially designed as a rocker or lever, an unlocking or locking system can be realised with few components, whereby through the leverage effect any amount of leverage force or travel directions can be achieved with one and the same cylinder piston system. Such a pyrotechnic actuator can be used for example as an unlocking mechanism for conventional roll bar systems, where electromagnetic unlocking mechanisms have been used up till now. The pyrotechnic actuator can with its cylinder piston system replace conventional solenoids, which are not only heavy in regard to their deadweight, but are also complicated and expensive in regard to their structure. Through corresponding sealing of the cavity by the piston itself and the housing shape a darting flame or gas arising during the explosion does not escape from the piston, so that the pyrotechnic actuator works very gently and on the other hand cannot ignite flammable substances which may escape from a vehicle in the event of an accident. If with conventional electromagnetic unlocking systems for roll bars on vehicles the solenoid is secured to a housing, which seats the unlocking bar or lever, the cavity can be an integral part of the housing, as a result of which parts are saved to advantage and at the same time the system can be produced in few stages.

The pyrotechnic actuator can be used advantageously to release or move a roll-bar of a vehicle. In this case in an advantageous embodiment the roll-bar with its two ends and the parts inserted in these can interact with the cavity of the actuator housing, so that gas is produced by igniting the detonating capsules, which makes the roll-bar shoot out of its initial position. In the case of this application the piston should be rigidly attached to the roll bar. It is however also possible to operate the roll-bar by the piston via a gearbox. In this case it is possible to use a pyrotechnic actuator at each end of a roll-bar. It is also however conceivable that each end of an especially V- or U-shaped roll-bar interacts with a piston or forms this itself, whereby the pistons lie in cylinders, the working spaces of which are connected to each other via connection pipes, whereby a detonating capsule and a suitable explosive for the gas development are placed in the connecting pipe. As soon as the detonating capsule is ignited, gas arises in the feed pipes, which moves the pistons and with them the roll-bar with or without using a gearbox from the initial position to the terminal position. Through the explosion-type development of the quantity of gas the roll-bar is moved in a few milliseconds from the initial to the terminal position. By means of corresponding locking- and retention mechanisms, which can be arranged on the roll-bar itself, the roll-bar is securely retained in its terminal position.

It is naturally evident that the size of the pyrotechnic actuator can be larger or smaller depending on the type of use, so that the corresponding stroke of the piston or force needed to trigger the operation is achieved. It is equally conceivable that ratchet or retaining elements are provided which are moulded or secured on the piston or cylinder, which with the gas development are destroyed in particular broken off, so that the piston can reach its terminal position. The piston can then be retained in its terminal position by additional retaining elements, as soon as it has reached this position.

If the pyrotechnic actuator is used in such a way that the piston does not have to be retained in its terminal position, the corresponding locking mechanism to retain the piston in its terminal position can be dispensed with, as a result of which less material and parts are needed to make the pyrotechnic actuator.

It is clearly evident that the form of the cylinder and piston can be selected as required. If the cavity has to be cut in the housing in a subsequent machining operation, it is especially easy from the design aspect to select a circular form of the cylinder, as a result of which the cavity can be made by means of a pocket hole.

If the housing is made from a plastic, this can be reinforced by additional metal parts against the effects of outside mechanical forces. Equally the piston can be reinforced by additional reinforcing parts, which advantageously equally form the ratchet- and/or retaining elements.

Possible embodiments of the pyrotechnic actuator are explained using drawings in more detail below.

Figure 1A:
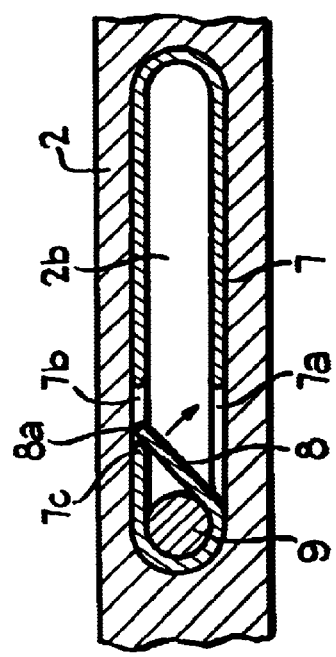
Figure 9A:
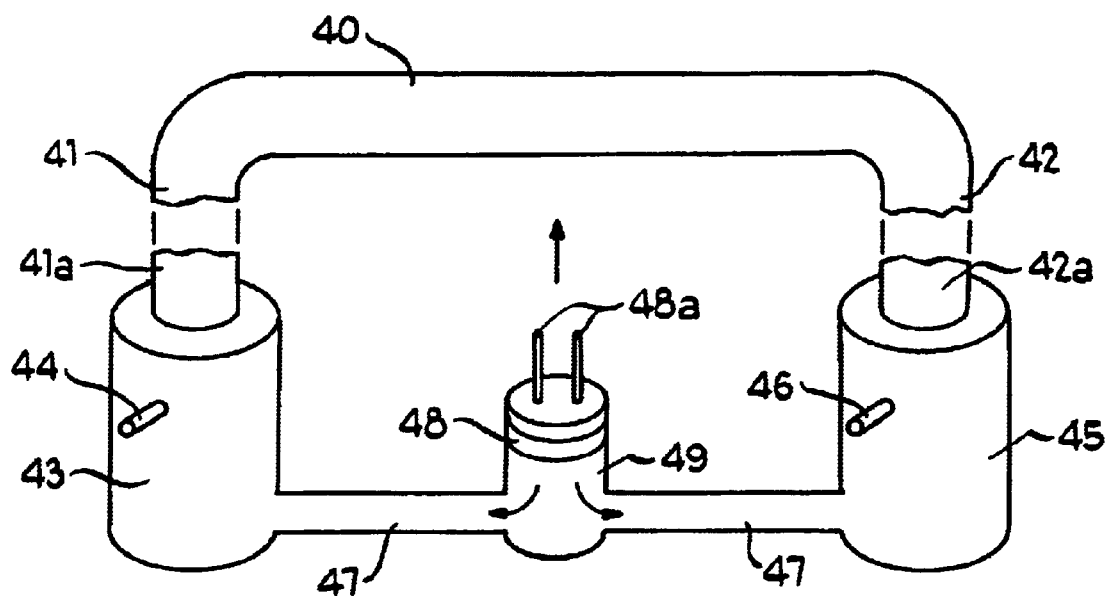
Figure 9B:
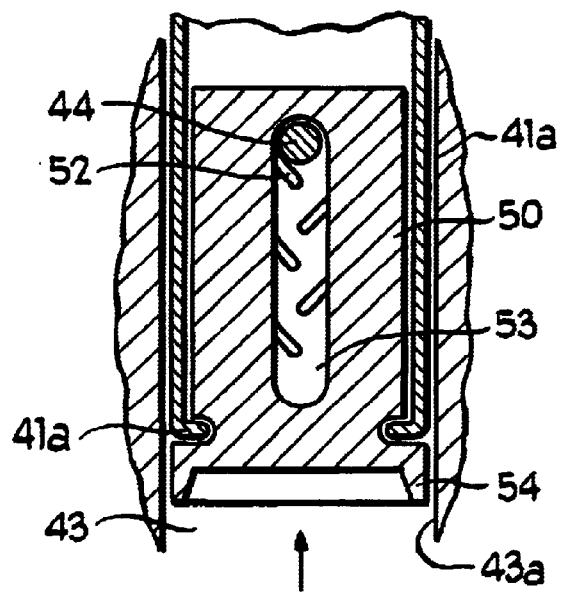

These show:

FIG. 1: a cross-section illustration through the pyrotechnic actuator according to the invention;

FIG. 1*a*: a detailed enlargement of the pyrotechnic actuator according to FIG. 1;

FIGS. 2*a*–2*c*: a pyrotechnic actuator with several snap-in elements;

FIG. 3: a perspective view of a piston with a locking pin;

FIG. 4: a perspective view of a piston with two window-type apertures and a U-shaped locking pin;

FIG. 5: an enlargement of the base geometry of the piston for a better seal between piston and cylinder;

FIG. 6: a further embodiment of a ratchet so that the piston can only be moved from the initial position to the terminal position and not back again;

FIGS. 7*a*–7*c*: a further embodiment of a pyrotechnic actuator according to the invention;

FIG. 8: pyrotechnic actuator integrated in a functional housing;

FIG. 9*a*: a roll bar system for a vehicle;

FIG. 9*b*: a piston for the pyrotechnic actuator integrated in the roll bar end FIG. 1 shows a pyrotechnic actuator with a housing 1, in which lies a piston bush sleeve 6 preferably made from corrosion resistant metallic material (Dural or V2A-steel). An encapsulated electrical detonator 3 is arranged in the piston bush sleeve 6, the electrical connections 3a of which are fed through an aperture 10 to the socket 17. The piston 2 is displaceably received in the piston bush sleeve 6. A part 15 is secured on its end 2a of the piston 2 facing away from the detonator 3, by means of which certain operations can be triggered when the detonator 3 is ignited. As soon as the detonator 3 is electrically ignited, gas development arises, whereby the expanding gas moves the piston 2 to the left in the piston bore 5. So that the piston 2 in the untriggered condition cannot be moved out of its initial position by mechanical impact or other forces, the piston is locked by means of a pin 9 and a locking element 8, which is secured on the piston. The pin 9 is permanently fixed opposite the housing 1 and can be especially secured to this. Should the piston 2 be moved in the direction of the arrow, a sufficiently large force must be applied, so that the pin 9 can pivot the contact stud 8, as illustrated in FIG. 1a, in the direction of the arrow, as a result of which the path from the area 2b' to the area 2b" becomes free for the pin or stud 9. As soon as the pin or stud 9 reaches the area 2b" the contact stud 8 which is especially made from a sprung material again pivots back into its initial position illustrated in FIG. 1a as a result of which the path for the pin is blocked from the area 2b" to the area 2b'. The contact stud 8 with its free end 8a lies against a stop 7c of an interlocking strip 7 and cannot be swung further against the direction of the arrow without being destroyed. For this purpose the interlocking strip 7 has a cavity 7b into which the free end 8a of the contact stud 8 can engage and one edge 7c of which forms the stop for the contact stud 8. If the interlocking strip 7 is a curved metal plate, the contact stud 8 can in some cases be stamped from the plate, as a result of which the cavity 7a arises at the same time, into which the contact stud 8 can be swung by the locking pin 9, as a result of which the path from the area 2b' to the area 2b" becomes free. If the pin 9 has not completely passed the contact stud 8, the stud 9 can be brought back to its initial position.

In an embodiment not illustrated, the contact stud 8 is moulded directly on the piston 2, whereby the interlocking strip 7 of the actuator according to FIG. 1 can be dispensed with. The contact stud 8 can also be a separate part which lies in a corresponding cavity of the piston 2.

The housing 1 can for example be fitted in a vehicle using securing means 14. In the housing 1 however inserts 13 made from metallic material can also be moulded or cast which serve to assemble the pyrotechnic actuator for example in a vehicle.

So that the pyrotechnic actuator is not triggered for example by a static charge in the unassembled condition, the electrical connections 3a are short-circuited by means of an electrical short-circuit element 11. The short-circuit element 11 can be secured by means of a snap-connection 12 on the housing 1 and especially can only be detached from the housing 1 by destroying the connection 12. The socket 17 has an inner thread 16, so that a plug (not illustrated) can be screwed into the socket 17. As soon as the plug is screwed into the socket 17 the short-circuit element 11 is moved away from the electrical connections 3a so that the short-circuit is broken and the electrical detonator can be ignited via the vehicle electronics. Alternatively the plug can also be locked by means of a plug or snap connection on the housing.

FIGS. 2a–2c show a socket with several interlocking elements 8, so that when the piston 2 moves from its initial position (FIG. 2a) to its terminal position (FIG. 2c) the locking pin 9 must pass through several interlocking stages. As soon as the piston is displaced in the direction of the arrow (FIG. 2b), the locking pin 9 first passes the contact stud 8'. As soon as it has fully passed the contact stud 8', this pivots back to its initial position. Subsequently the locking pin 9 pivots the next contact stud 8". As soon as it has passed this, it comes to the next locking contact stud 8'''. After it has reached the terminal position, that is to say has passed the last contact stud 8n, this equally again pivots to its initial position and prevents the piston 2 from going back again to its initial position (FIG. 2a).

FIG. 3 shows a piston 2 with an oblong cavity 2b, whereby the cavity 2b extends in the direction of movement of the piston 2. The length of the cavity 2b in this case is such that the locking pin 9, which engages in the cavity 2b, in the initial position of the piston strikes the one face of the cavity 2b and in the terminal position strikes the other face of the cavity 2b. It therefore also serves as a travel limiter for the piston 2. It can be designed so that it prevents the stud 2 from fully sliding out of the cavity. In FIG. 3 for reasons of clarity no securing elements as for example the contact stud 8 in FIG. 1 are shown.

FIG. 4 shows a further embodiment of a piston 20, which has two oblong cavities 20b' and 20b". A locking element which has two moulded pins or engagement elements 90' and 90" engages into these oblong cavities which are connected to each other via the connecting link 91. The connecting link 91 can for example be formed by the housing of the pyrotechnic actuator. Also in FIG. 4 the snap-in elements or securing elements are not shown for reasons of clarity.

FIG. 5 shows a cutout of the piston 2. The piston 2 is displaceably received in the piston bore 5. As soon as the developing quantity of gas impinges on the piston 2, the ends 2c directed against the detonator, which form the cavity 2d, are compressed outwards against the cylinder or cavity inner wall 5a, as a result of which no gas can escape between the piston 2 and the cylinder wall 5a. The piston is therefore sealed without additional sealing elements.

FIG. 6 shows a further embodiment, in which the piston 30 is displaceably received in a cavity 5 of a housing 1, whereby the piston 30 has a cavity 30a, which on its one side has a saw-tooth shaped surface contour 32, which interacts with sprung contact studs 31, so that displacement of the piston 6 is only possible in the direction of the arrow. FIG. 6 shows the piston 30 in its initial position. As soon as the electrical detonator is ignited, a gas develops through the explosion by which the piston 30 is moved in the direction of the arrow. The forces developed in this case are enough to eject the sprung contact studs 31 upwards so that the piston can be moved freely to the left. So that the piston is not braked unnecessarily by the saw-tooth shaped contour in the area between the initial position and the terminal position, the surface can be designed without saw-teeth in the middle area. As a result the piston 30 can be accelerated unbraked in the direction of its terminal position. Only in the vicinity of the terminal position do the contact studs 31 interact with the saw-tooth profile of the piston 30, so that the piston after reaching the terminal position or shortly before reaching the terminal position cannot go back again to the initial position.

It is naturally evident that with the aforementioned and also the following embodiments the operation can be reversed in each case. Thus for example the saw-tooth shaped contour of the surface can be arranged in the cylindrical inner wall of the housing 1, whereby the sprung contact studs must then be moulded or secured on the piston.

FIGS. 7a–7c show a further possible embodiment of a pyrotechnic actuator. This pyrotechnic actuator equally has a housing 1, in the cavity 5 of which a piston 2 is displaceably received. In the cavity 5 equally a detonator 3 producing the quantity of gas is arranged, which can be ignited via its electrical connections 3a. In the unassembled condition of the pyrotechnic actuator the electrical connections 3a are short-circuited by means of a short-circuit element 11, so that inadvertent ignition of the detonator 3 for example by a static charge is prevented. The short-circuit element 11 is supported by means of a connection 12 on the housing 1. The piston 2 has moulded walls 2d, which form a space 2e, in which the detonator 3 lies, when the piston 2 is located in its initial position (FIG. 7a). Two contact studs 2z are moulded on the piston which on the one hand prevent the piston 2 from moving inadvertently by mechanical influences from its initial position to its terminal position (FIG. 7b) and at the same time ensure that after reaching the terminal position the piston cannot go back to its initial position. The contact studs 2z interact here in each case with a projection 1b of the housing 1. The area 2i of the piston, which is located in the initial position between the two projections 1b is adapted with its outer circumference to the distance between the two projections 1b. The contact studs 2z have projections 2f, which ensure that only when there is sufficient force the contact studs 2z are compressed inwards in the cavities 2z' so that the contact studs with their projections 2f can be moved past the two projections 1b of the housing 1. When gas development takes place, the pressure in the direction of the arrow is so great that the contact studs 2z are swung by the projections 1b inwards. The contact studs 2z in each case have a cavity 2g, the size of which is such that the projections 1b fit with positive locking into the cavity 2g. As soon as the piston 2 has been brought to its terminal position (FIG. 7b) the sprung contact studs 2z pivot outwards, so that in each case a projection 1b comes to lie in a cavity 2g of a contact stud 2z. The cavity 2g is formed by the projections 2f and 2h of the contact stud 2z. It is naturally clear that in a further embodiment the contact studs can be arranged on the housing and the projections on the piston. This means a reverse of the operating principle, as a result of which however the desired function continues as before.

The free ends of the contact studs can also be moulded on the piston so that the contact studs only represent a bulge of the piston.

FIG. 7c shows a view from above over the short-circuit element 11, which is secured with the snap-connection 12 on the housing 1 and short circuits the two electrical connections 3a of the electrical detonator. The short-circuit element 11 is dependant on the function made from an electrically conductive and especially corrosion resistant material.

FIG. 8 shows a pyrotechnic one-way actuator which is integrated in a housing 1, whereby in addition a rocker 33 is pivotably arranged around a stud 38 in the housing 1. The rocker 33 with its one arm 35 grips the piston 2, which for this purpose has a window-type aperture 2j. The piston 2 lies in the cavity 5 of the housing 1 and is securely retained in its initial position by means of a locking stud 9 and the retention contact stud 8 moulded on the piston 2. As soon as the electrical detonator 3 is ignited via its electrical connections 3a, a gas develops in the cavity 5, which moves the piston 2 in the direction of the arrow. The force of the gas in this case is such that the contact stud 8 of the locking stud 9, which grips the window-type aperture 2b of the piston 2, pivots so that the locking stud can move from the area 2b' to the area 2b". Afterwards the contact stud 8 again pivots into its initial position, as a result of which the piston cannot move back again to its initial position. While the piston 2 is moved in the direction of the arrow, the rocker is pivoted against the force of the spring F moulded on the housing 1, so that the catch 36 of the rocker 33 with its undercut 37 releases a part not illustrated, which lies in the cavity 39 of the housing 1. As a result of locking by means of stud 9 and contact stud 8 the spring F could be dispensed with, if the contact stud 8 is designed accordingly.

FIG. 9a shows a further embodiment for using the pyrotechnic actuator in a safety system, especially a roll-bar of a vehicle, which in the event of an accident is moved out of its concealed position so that the heads of passengers are protected if the vehicle rolls over. The roll-bar 40 has two arms 41, 42, which with their ends 41a and 42a seat the piston 50 and lie in cylinders 43, 45. The cylinders are connected via connection pipes 47 to a container 49, in which an electrical detonator 48 is arranged, which can be ignited via its electrical connections 48a. After ignition the detonator 48 develops a quantity of gas, which moves the pistons and by means of these the roll-bar in the direction of the arrow. The piston 50 (FIG. 9b) can be moved by means of a snap-connection or edging 41a' into the pipe-shaped ends 41a of the roll-bar 40 and arrested there. The piston 50 has thin moulded walls 54, which are pressed by the gas against the cylinder wall 43a and therefore have a sealing function. The locking pin 44 passes through a window-type aperture 53 of the piston and the end 41a of the roll-bar 40. Sprung contact studs 52 are arranged in the piston 50, which interact with the locking stud 44, in such a way that the roll-bar 40 can only be moved in the direction of the arrow. It is naturally evident that corresponding ratchet mechanisms can be arranged not only in the piston, but additionally or even instead outside the pneumatic cylinder. Through integration in the piston however a cost-efficient embodiment results, in which relatively few parts are required.

It is also possible to allocate a pyrotechnic actuator to each end 41a, 42a of the roll-bar 40 in each case, as a result of which the connection pipes 47 can be dispensed with.

What is claimed is:

1. Pyrotechnic actuator, including a piston and a housing (1) which has a cavity (5), in which the piston (2) is displaceably received, whereby the piston (2) can be displaced by means of a quantity of gas arising when an explosive is ignited from an initial position to a terminal position and the piston (2) on the way to the terminal position or when the terminal position is reached triggers an operation, and at least one snap-in element (2z) retains the piston (2) in the initial position, characterised in that at least the snap-in element retains the piston (2) in the terminal position with positive locking when this terminal position is reached, and the snap-in element after reaching the terminal position of the piston (2), by means of positive locking prevents the piston (2) from going back into the initial position, whereby the snap-in element is a contact stud (2z) or a bow-spring, which in the initial position grips an undercut (1b) of the cavity (5) whereby minimum force is necessary to overcome the lock.

2. Pyrotechnic actuator according to claim 1, characterised in that the at least one snap-in element or retaining element (8) is moulded on the piston.

3. Pyrotechnic actuator according to claim 1, characterised in that the housing (1) has at least one snap-in catch (1b) which grips at least one undercut of the snap-in element (2z) or the piston (2), if the piston (2) is located in the vicinity of the terminal position.

4. Pyrotechnic actuator according to claim 3, characterised in that the snap-in catch (1b) is moulded on the housing (1) or is secured on the housing.

5. Pyrotechnic actuator according to claim 1, characterised in that an electrical detonator (3) is arranged in the cavity (5).

6. Pyrotechnic actuator according to claim 5, characterised in that the electrical connections (3a) of the electrical detonator (3) are fed out through an aperture (10) from the cavity (5), and that a short-circuit element (11) short-circuits the connections (3a), whereby the short-circuit caused by the short-circuit element (11) when inserting a plug, which connects the detonator (3) with an electronic controller, is broken.

7. Pyrotechnic actuator according to claim 6, characterised in that the short-circuit element (11) has or is a bridge made from conductive material, which is pivotable or bendable and is supported on the housing (1) of the actuator.

8. Pyrotechnic actuator according to claim 6, characterised in that the short-circuit element (11) is supported by means of a ratchet or positive-fitting connection (12) on the housing (1) or is moulded into the housing (1) during manufacture.

9. Pyrotechnic actuator according to claim 1, characterised in that an interlocking part (7) lies in the cavity (5) of the housing (1), which is made from metal plate, and which forms the one or the several snap-in elements (8).

10. Pyrotechnic actuator according to claim 9, characterised in that the interlocking part (7) lies at least in sections against the wall of the cavity (2b).

11. Pyrotechnic actuator according to claim 1, characterised in that the piston is reinforced constructively by reinforcing means made from metallic material, whereby the reinforcing means grip around the piston or are embedded in this.

12. Pyrotechnic actuator according to claim 11, characterised in that the reinforcing means comprise the at least one snap-in elements.

13. Pyrotechnic actuator according to claim 1, characterised in that the cavity is a through- or pocket hole, and the inner diameter of the hole in one section is greater than in an adjacent section, whereby the at least one snap-in element and/or the sprung contact stud is moulded on the piston and pressure is applied to the snap-in element or the contact stud against the wall of the section with the smaller inner diameter, when the piston is in the initial position and that when the piston moves to the terminal position the snap-in element or the contact stud depending on the force acting radially outwards in the direction of the cavity wall on reaching the section with the greater inner diameter is pivoted radially outwards and when the piston moves in the direction of the initial position the snap-in element or the contact stud strikes the projection formed by the change in diameter.

14. Pyrotechnic actuator according to claim 1, characterised in that in addition to the piston (2) a pivotable and/or displaceably held part (33) is arranged in the housing (1), which is connected to the piston (2) and with the movement of the piston (2) is pivoted and/or displaced from its initial position to its terminal position.

15. Pyrotechnic actuator according to claim 14, characterised in that the part (33) is a rocker or a lever, which with its one arm (34) lies in a cavity (2j) of the piston.

16. Use of a pyrotechnic actuator according to claim 1, characterised in that a roll-bar (40) of a vehicle can be moved by means of the actuator.

17. Use of a pyrotechnic actuator according to claim 16, characterised in that the roll-bar (40) is connected rigidly to the piston.

18. Use of a pyrotechnic actuator according to claim 17, characterised in that a part (41a, 42a) of the roll-bar (40) forms a piston.

19. Use of a pyrotechnic actuator according to claim 18, characterised in that the part (41a, 42a) is secured or moulded on the roll bar.

20. Use of a pyrotechnic actuator according to claim 16, characterised in that in each case one end (41a, 42a) of a U- or V-shaped roll-bar (40) is driven in each case by at least one actuator.

21. Use of a pyrotechnic actuator according to claim 16, characterised in that the ends (41a, 42a) of a U- or V-shaped roll-bar (40) are connected to pistons of a pneumatic or hydraulic cylinder or form the pistons themselves, whereby the working spaces of the pneumatic or hydraulic cylinder are connected via pressure pipes (47) to a working space of a further cylinder, whereby this working space is reduced by moving the piston of the actuator form the initial position to the terminal position in such a way that a fluid in the pressure pipes moves the pistons of the pneumatic or hydraulic cylinder, so that the roll-bar in the event of an accident is moved to the passenger protecting position.

22. Use of a pyrotechnic actuator according to claim 16, characterised in that the ends (41a, 42a) of a U- or V-shaped roll-bar (40) are connected to pistons of a pneumatic or hydraulic cylinder or form the pistons themselves, whereby the working spaces of the pneumatic or hydraulic cylinder are connected via pressure pipes (47) to a space, whereby in this space the gas development can be triggered by igniting an explosive, in such a way that via the pressure pipes (47) the gas moves the piston of the pneumatic or hydraulic cylinder, so that the roll-bar in the event of an accident is moved to the passenger protecting position.

23. Use of a pyrotechnic actuator according to claim 1, characterised in that the actuator moves at least one locking mechanism of a closing, interlocking and/or unlocking system.

24. Use of a pyrotechnic actuator according to claim 23, characterised in that the actuator unlocks, unblocks, locks, blocks, opens and/or closes the closing, interlocking and/or unlocking system when necessary.

25. Pyrotechnic actuator according to claim 9, wherein the metal plate comprises spring steel plate.

26. Pyrotechnic actuator, including a piston and a housing (1) which has a cavity (5), in which the piston (2) is displaceably received, whereby the piston (2) can be displaced by means of a quantity of gas arising when an explosive is ignited from an initial position to a terminal position and the piston (2) on the way to the terminal position or when the terminal position is reached triggers an operation, and at least one snap-in element (2z) retains the piston (2) in the initial position, characterised in that at least the snap-in element retains the piston (2) in the terminal position with positive locking when this terminal position is reached, and the snap-in element after reaching the terminal position of the piston (2), by means of positive locking prevents the piston (2) from going back into the initial position, whereby the piston (2) has a window-type aperture or oblong cavity (2b), extending in the lengthwise direction of the piston (2) and a gripping mechanism (9) supported on the housing (1), the gripping mechanism (9) comprising a pin or stud that passes through the aperture (2b) or engages in the cavity (2b), whereby the snap-in element (2z,8) together with the pin or stud (9) retains the piston (2) in the initial position.

27. Pyrotechnic actuator according to claim 26, characterised in that the snap-in element or at least a further snap-in element together with the gripping mechanism retains the piston in the terminal position, whereby the snap-in element is especially a sprung contact stud.

28. Pyrotechnic actuator according to claim 26, characterised in that the one and/or each further snap-in element is a contact stud, whereby each contact stud with its free end points against the movement direction from the terminal position to the initial position.

29. Pyrotechnic actuator according to claim 26, characterised in that the gripping mechanism (9) pivots or ejects the snap-in element or the contact stud (2z,8) when the piston (2) moves to the terminal position.

30. Pyrotechnic actuator according to claim 26, characterised in that the snap-in element (8) blocks the window-type aperture (2b) for the gripping mechanism (9), after the piston (2) has reached at least the terminal position.

31. Pyrotechnic actuator according to claim 26, characterised in that the gripping mechanism (9) presses the free end (8a) of the snap-in element (8) against a stop (7c), if the piston (2) is moved in the direction of the initial position.

32. Pyrotechnic actuator according to claim 26, characterised in that each snap-in element (8) after passing the gripping mechanism (9) blocks the window-type aperture (2b) by positive locking for the gripping mechanism (9).

33. Pyrotechnic actuator according to claim 31, wherein the stop comprises the wall of the window-type aperture (2b).

* * * * *